(12) United States Patent
Fänge et al.

(10) Patent No.: US 11,856,456 B2
(45) Date of Patent: Dec. 26, 2023

(54) WIRELESS COMMUNICATION CONTROL BASED ON SHARED DATA

(71) Applicants: Sony Group Corporation, Tokyo (JP); Sony Network Communications Europe B.V., Hoofddorp (NL)

(72) Inventors: Thomas Fänge, Basingstoke (GB); Mattias Falk, Basingstoke (GB); Magnus Tillgren, Basingstoke (GB); Henrik Sundström, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 58 days.

(21) Appl. No.: 17/681,736

(22) Filed: Feb. 26, 2022

(65) Prior Publication Data

US 2022/0312268 A1 Sep. 29, 2022

(30) Foreign Application Priority Data

Mar. 29, 2021 (SE) .................................. 2150381-8

(51) Int. Cl.
*H04W 4/42* (2018.01)
*H04W 4/38* (2018.01)
(Continued)

(52) U.S. Cl.
CPC ... *H04W 28/0867* (2020.05); *H04W 28/0942* (2020.05); *H04W 28/0958* (2020.05); *H04W 72/21* (2023.01)

(58) Field of Classification Search
CPC ......... H04W 28/0867; H04W 28/0942; H04W 28/0958; H04W 72/21; H04W 48/04;
(Continued)

(56) References Cited

U.S. PATENT DOCUMENTS 6,052,722 A 4/2000 Taghadoss
7,359,714 B2 * 4/2008 Parupudi ............... H04W 4/029
455/418

(Continued)

FOREIGN PATENT DOCUMENTS

CN 105681585 A * 6/2016
CN 115733918 A * 3/2023
(Continued)

OTHER PUBLICATIONS

Office Action and Search Report from corresponding Swedish Application No. 2150381-8, dated Dec. 6, 2021, 9 pages.

*Primary Examiner* — Ahmed Elallam
(74) *Attorney, Agent, or Firm* — TUCKER ELLIS, LLP

(57) ABSTRACT

A wireless device includes first and second transceivers for wireless communication and is operable to switch between first and second states, with the second state at least partly prohibiting communication by the first transceiver. The wireless device is configured to perform a control method which involves sharing of state data among wireless devices. According to the method, the wireless device receives, by the second transceiver, a state indicator and confidence data from one or more other wireless devices. The state indicator indicates a current state of the respective other wireless device, and the confidence data is indicative of a confidence of the current state. The control method sets the wireless device in the first or second state based on the state indicator and the confidence data.

20 Claims, 5 Drawing Sheets

(51) Int. Cl.
  *H04W 48/04* (2009.01)
  *H04M 1/72454* (2021.01)
  *H04M 1/72463* (2021.01)
  *H04M 1/72448* (2021.01)
  *H04W 28/08* (2023.01)
  *H04W 72/21* (2023.01)
  *H04W 76/34* (2018.01)

(58) Field of Classification Search
  CPC ......... H04W 4/38; H04W 4/42; H04W 76/34; H04M 1/72412; H04M 1/72454; H04M 1/72463; H04M 1/72448
  See application file for complete search history.

(56) References Cited

U.S. PATENT DOCUMENTS

| | | | |
|---|---|---|---|
| 8,606,253 B2 | 12/2013 | Ahn et al. | |
| 8,626,111 B2 * | 1/2014 | Waddell | H04M 1/72457 455/404.1 |
| 9,095,001 B2 * | 7/2015 | Lemmon | G06F 21/74 |
| 9,369,861 B2 * | 6/2016 | Baker | H04W 8/18 |
| 10,218,836 B2 * | 2/2019 | Lee | H04W 4/021 |
| 10,575,156 B2 | 2/2020 | Shedletsky et al. | |
| 10,629,067 B1 * | 4/2020 | Komoni | G01S 5/0264 |
| 11,588,932 B2 * | 2/2023 | Coppin | H04M 1/72457 |
| 2004/0002948 A1 | 1/2004 | Mantyjarvi et al. | |
| 2005/0136837 A1 | 6/2005 | Nurminen et al. | |
| 2014/0179295 A1 | 6/2014 | Luebbers et al. | |
| 2015/0079962 A1 | 3/2015 | Baker | |
| 2015/0126170 A1 | 5/2015 | Iyer et al. | |
| 2016/0227600 A1 | 8/2016 | Shedletsky et al. | |
| 2018/0374355 A1 | 12/2018 | Hosokawa et al. | |
| 2021/0044929 A1 | 2/2021 | Ridgill, II | |
| 2021/0229829 A1 * | 7/2021 | Mikic | B64D 43/02 |
| 2022/0217232 A1 * | 7/2022 | Nachbar | H04W 4/38 |
| 2022/0312152 A1 * | 9/2022 | Sundström | H04W 52/0258 |

FOREIGN PATENT DOCUMENTS

| | | | |
|---|---|---|---|
| WO | 2017051211 A1 | 3/2017 | |
| WO | 2020176107 A1 | 9/2020 | |
| WO | WO-2021031851 A1 * | 2/2021 | ........... G06F 3/0346 |

* cited by examiner

WIRELESS COMMUNICATION CONTROL BASED ON SHARED DATA

RELATED APPLICATION DATA

This application claims the benefit of Swedish Patent Application No. 2150381-8, filed Mar. 29, 2021, the disclosure of which is incorporated here by reference in its entirety.

TECHNICAL FIELD

The present disclosure relates to functions in wireless devices and, in particular, techniques for operating a wireless device to automatically suspend communication by one of its wireless transceivers, for example based on data indicating that the wireless device is located in an aircraft.

BACKGROUND

Airlines generally prohibit the use of equipment that transmits radio-frequency (RF) signals, such as cellular transmission signals, at least during takeoff and landing to avoid interference with flight navigation systems. It has been proposed to provide wireless devices with an autonomous function that automatically suspends RF signal transmission upon detection of specific aircraft flight events such as takeoff or landing. This function may be used in wireless devices that are attached or otherwise associated with cargo and configured to transmit position data for tracking the cargo in transit.

For safety reasons, such an autonomous function needs to be accurate. With respect to cargo-tracking devices, regulatory authorities require these devices to be configured for automated radio suspension in flight by use of so-called multiple modes of redundancy. For example, EASA (European Union Aviation Safety Agency) stipulates that a cargo-tracking device should be designed with a minimum of two independent models to turn off the cellular or mobile functions when airborne. These models should operate on data from independent sensors to identify that the aircraft is in flight.

Despite such measures of redundancy, there is a need to improve the autonomous function at least with respect to false negatives, by which an aircraft flight event occurs but is not detected. This need is relevant to any wireless device that has an autonomous function which is operable to prohibit a specific type of wireless communication.

SUMMARY

It is an objective to at least partly overcome one or more limitations of the prior art.

A further objective is to improve an autonomous function in a wireless device for preventing that the wireless device performs a specific type of wireless communication.

One or more of these objectives, as well as further objectives that may appear from the description below, are at least partly achieved by a wireless device according to the independent claim, embodiments thereof being defined by the dependent claims.

A first aspect of the present disclosure is a wireless device. The wireless device comprises a first transceiver for wireless communication and a second transceiver for wireless communication. The wireless device is operable to switch between a first state in which the wireless device at least allows data transmission via the first transceiver and at least allows data reception via the second transceiver, and a second state in which the wireless device at least forbids data transmission via the first transceiver and at least allows data reception via the second transceiver. The wireless device is configured to perform a method comprising: receiving, by the second transceiver, a state indicator and confidence data from a respective other wireless device in a group of wireless devices, wherein the state indicator indicates a current state of the respective other wireless device, and wherein the confidence data is indicative of a confidence of the current state of the respective other wireless device; and setting the wireless device in the first or second state based on the state indicator and the confidence data.

A second aspect is a method performed by a wireless device in a group of wireless devices. Each of the wireless devices comprises a first transceiver for wireless communication and a second transceiver for wireless communication and is operable to switch between a first state in which the wireless device at least allows data transmission via the first transceiver and at least allows data reception via the second transceiver, and a second state in which the wireless device at least forbids data transmission via the first transceiver and at least allows data reception via the second transceiver. The method comprises: receiving, by the second transceiver, a state indicator and confidence data from a respective other wireless device in the group of wireless devices, wherein the state indicator indicates a current state of the respective other wireless device, and wherein the confidence data is indicative of a confidence of the current state of the respective other wireless device; and setting the wireless device in the first or second state based on the state indicator and the confidence data.

A third aspect is a computer-readable medium comprising instructions which, when installed on a processing system, causes the processing system to perform the method of the second aspect.

Still other objectives and aspects, as well as features, embodiments and technical advantages will appear from the following detailed description, the attached claims and the drawings.

DETAILED DESCRIPTION OF EXAMPLE EMBODIMENTS

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure. As used herein, the terms "multiple", "plural" and "plurality" are intended to imply provision of two or more elements, whereas the term "set" is intended to imply a provision of one or more elements. The term "and/or" includes any and all combinations of one or more of the associated listed elements.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

Figure 1A:
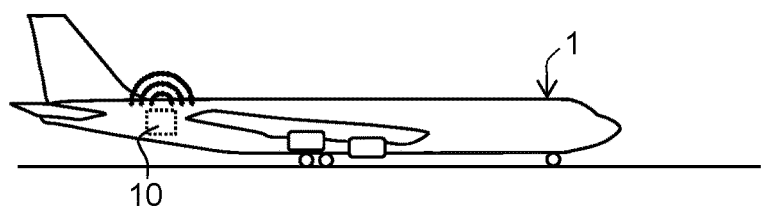
FIGS. 1A-1C illustrate a wireless device in an aircraft before start, during takeoff and during flight.
Figure 1B:
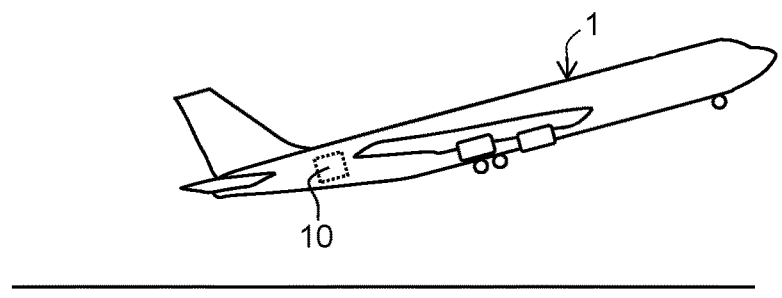
Figure 1C:
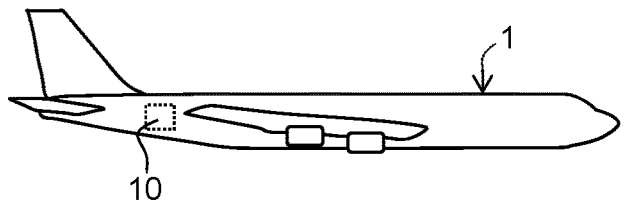

FIGS. 1A-1C illustrate a use case of a wireless device in accordance with some embodiments. FIG. 1A shows an aircraft 1 at an airport before takeoff, for example while taxiing towards a runway. A wireless device 10 is located inside the aircraft 1 and operates to intermittently transmit an RF signal, as indicated by a transmission symbol, over WWAN network, for example a cellular network. In one example, the wireless device 10 is a cargo-tracking device, also known as logistics tracker, which is attached to or otherwise combined with goods in transport and configured to transmit its position, optionally together with further measured data such as temperature, pressure, moisture etc., by the RF signals.

As noted in the Background section, regulations prohibit the use of equipment that transmits RF signals during flight events such as takeoff and landing to avoid interference with flight navigation systems. Cargo-tracking devices are autonomous devices and therefore configured to detect one or more dedicated flight events, such as takeoff and landing, and automatically enter flight mode upon detection of such a flight event. Further, it may be desirable to keep cargo-tracking devices in flight mode during flight, to conserve battery power. FIG. 1B shows the aircraft 1 during takeoff from the runway, with the wireless device 10 being set in flight mode to thereby refrain from transmitting RF signals. FIG. 1C shows the aircraft at cruise altitude, with the wireless device 10 being kept in flight mode.

FIGS. 1A-1C are also applicable to a use case in which the wireless device 10 is a smartphone or other electronic equipment carried by a passenger onto the aircraft 1. Such a wireless device 10 may transmit the RF signals as a result of the passenger using the wireless device 10 for accessing the Internet or placing a phone call. To comply with the above-mentioned regulations, passengers are requested by aircraft staff to turn off all electronic equipment during takeoff and landing. To mitigate the risk that this request is overlooked or ignored by passengers, it is envisioned that future smartphones and other electronic equipment may be provided with an automated function similar to the one in cardo-tracking devices.

Figure 2A:
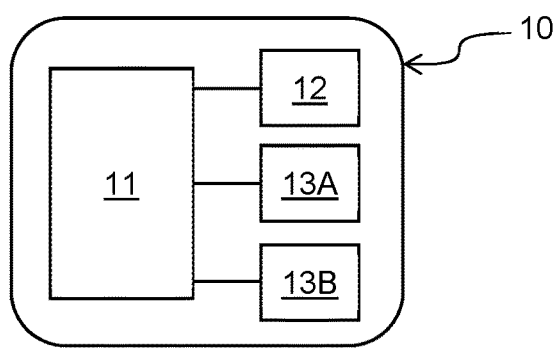
FIG. 2A is a block diagram of an example wireless device.

FIG. 2A is a schematic view of an example wireless device 10 in accordance with some embodiments. The wireless device 10 comprises a controller or control unit 11, which is configured to control the overall operation of the wireless device 10. The wireless device 10 further comprises a sensor arrangement or sensor system 12 which is configured to generate sensor data that may be processed, stored or transmitted by the wireless device 10. The wireless device 10 has a first transceiver 13A which is configured for any type of WWAN (Wireless Wide-Area Network) communication, including but not limited to cellular communication under various modes or protocols, such as voice calls, SMS, EMS, or MMS messaging, CDMA, TDMA, PDC, WCDMA, CDMA2000, GPRS, WiMAX, LTE, 5G NR, etc. In some embodiments, the first transceiver 13A is configured for wireless LPWAN (Low Power WAN) communication, for example by comprising components for cellular communication in accordance with 3GPP standards, UNB (Ultra NarrowBand) communication, telegram splitting communication, spread spectrum communication, etc. The wireless device 10 also has a second transceiver 13B, which is configured for wireless short-range communication, for example by one or more of Bluetooth, BLE, WiFi, LR-WPAN, UWB, ZigBee, Z-Wave, etc.

The wireless device 10 in FIG. 2A may be any type of electronic device configured for wireless communication, such as a cargo-tracking device, a mobile phone, a smart phone, a personal digital assistant (PDA), a tablet computer, a laptop computer, an IoT (Internet-of-Things) device, a wearable computer, etc.

In the following disclosure, it is assumed that the wireless device 10 may be switched between a set of states, which includes at least a first state and a second state. A switch between the first state and the second state may be direct or via an intermediate state. In the first state, the wireless device 10 is allowed to transmit data via transceiver 13A and may also be allowed to receive data via transceiver 13A. Further, in the first state, the wireless device 10 is allowed to receive data via transceiver 13B and may also be allowed to transmit data via transceiver 13B. In the second state, the wireless device 10 is forbidden to transmit data via transceiver 13A and may also be forbidden to receive data via transceiver 13A. Further, in the second state, the wireless device 10 is allowed to receive data via transceiver 13B and may also be allowed to transmit data via transceiver 13B. Thus, a switch from the first state to the second state restricts or prevents WWAN communication via transceiver 13A and may or may not restrict short-range communication via transceiver 13B.

The following examples presume that the wireless device 10 is configured to allow all short-range communication (receive/transmit) in the first and second states, allow all WWAN communication (receive/transmit) in the first state, and to prevent or prohibit all WWAN communication in the second state. The following examples will also be given under the assumption that the wireless device 10 is configured to switch from the first state to the second state when it detects a first event, for example that it is located in an aircraft (cf. 1 in FIG. 1) during takeoff or landing, and to switch from the second state to the first state when it detects a second event, for example that the aircraft has landed. During flight, the wireless device 10 may be in the second state, as shown in FIG. 1C, or in the first state, depending on implementation.

In the following, the first state is also denoted "normal mode", and the second state is also denoted "flight mode".

The embodiments described in the following presume that the wireless device 10 in included in a group of wireless devices that are all operable to detect the first and second events and switch between the first and second states accordingly. This group of wireless devices may include wireless devices of different hardware and/or software configuration. The respective wireless device in the group may be unaware of the other wireless device(s) in the group. In some examples, the group comprises logistics trackers from a specific manufacturer or logistics trackers that are deployed by one or more logistic companies, transportation service providers, etc. In another example, the group comprises smartphones from a specific manufacturer or a specific network operator. In another example, the group comprises any and all wireless devices that have the above-mentioned event detection and state switching functionality. As used herein, a group comprises two or more wireless devices.

Figure 2B:
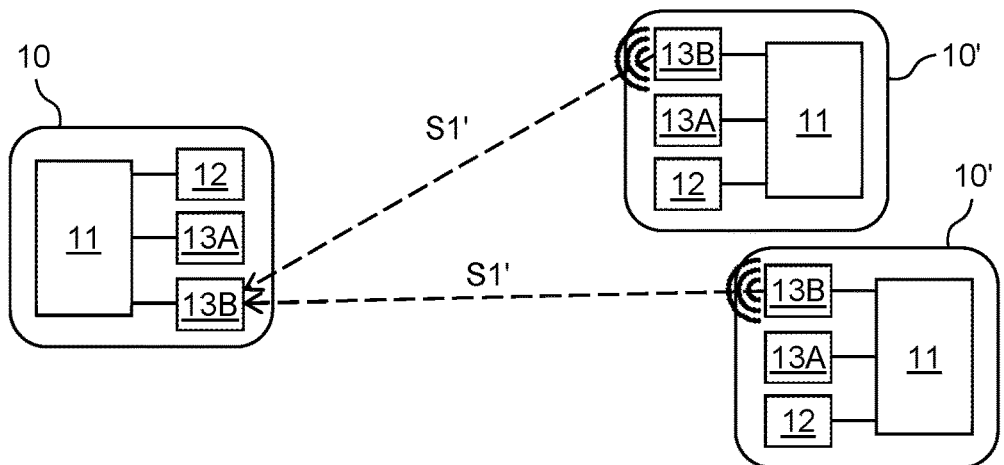
FIGS. 2B-2C are views of a wireless device communicating with other wireless devices within range.
Figure 2C:
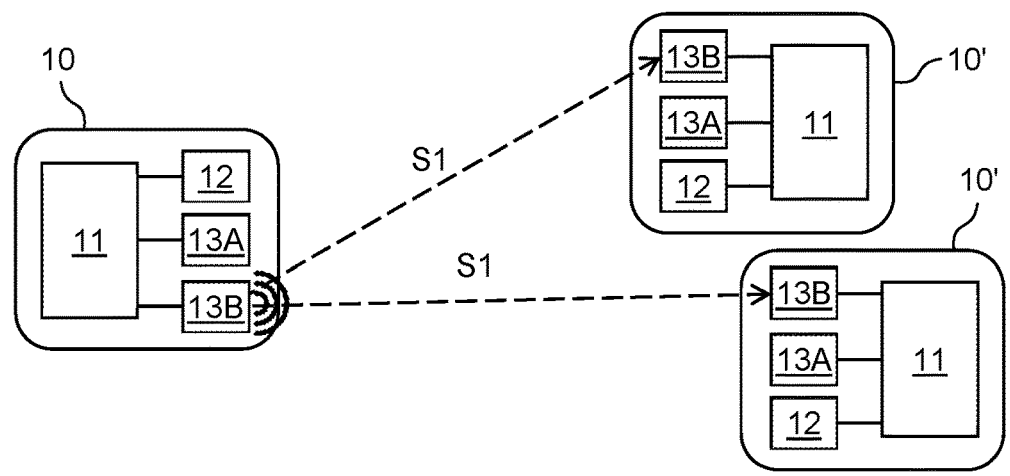

In some embodiments, all wireless devices in the group are configured to share information related to their current state by wireless short-range communication. FIG. 2B illustrates a wireless device 10 and two other wireless devices 10', which are located within range for short-range wireless communication. As shown, each of the other wireless devices 10' comprises a controller 11, a sensor system 12 and transceivers 13A, 13B. As indicated by transmission symbols, the devices 10' operate their short-range transceivers 13B to transmit a sharing signal S1', which is received by the short-range transceiver 13B of the wireless device 10. FIG. 2C corresponds to FIG. 2B and illustrate that the device 10 operates its transceiver 13B to transmit a sharing signal S1, which is received by the transceivers 13B of the wireless devices 10'. For example, the wireless devices 10, 10' may be logistics trackers which are co-located in a cargo compartment of an aircraft, or smartphones carried by passengers on the aircraft.

In some embodiments, the wireless device 10 is configured to broadcast the sharing signal S1 for interception by any other wireless device 10' within range, and to intercept a sharing signal S1', which is broadcast by a respective other wireless device 10' within range. The following description is given with reference to the wireless device 10. Therefore, the respective signal S1' is designated as an incoming signal, and the signal S1 is designated as an outgoing signal. The respective wireless device 10, 10' may be configured to intermittently broadcast the signal S1, S1' and listen for incoming signals S1', S1, in accordance with any scheme. The use of broadcasting allows the respective wireless device to dynamically communicate with any number of other wireless devices within range, without requiring any preceding coordination process, such as pairing. However, in an alternative embodiment, the wireless devices 10, 10' are paired before exchanging sharing signals.

Figure 3:
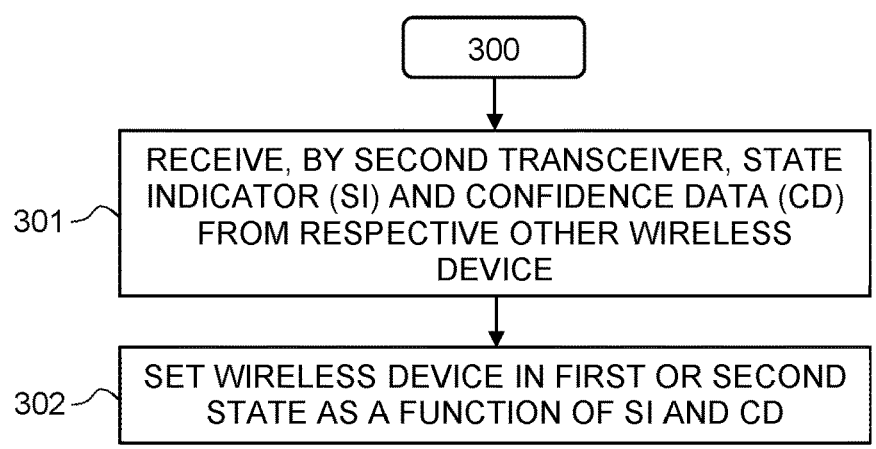
FIG. 3 is a flowchart of an example method performed by a wireless device.

FIG. 3 is a flowchart of a method 300 performed by the wireless device 10, and which may also be performed by each of the other wireless devices 10'. When performing the method 300, the wireless device 10 may be in either the first state or the second state. In step 301, the wireless device 10 receives, by the transceiver 13B, sharing data from a wireless device 10' within range. The sharing data comprises a state indicator (SI) and confidence data (CD), with SI being indicative of a current state of the wireless device 10', and CD being indicative of a confidence of the current state. CD is thus metadata that qualifies SI. For example, as will be described in more detail below, CD may indicate how or why the device 10' has been set in the current state. In step 302, the wireless device 10 is set in the normal mode (first state) or the flight mode (second state) based on SI and CD received in step 301. If the wireless device 10 is in normal mode, step 302 may keep it in normal mode or switch it to flight mode. If the wireless device 10 is in flight mode, step 302 may keep it flight mode or switch it to normal mode.

It is to be understood that the current state, as indicated by SI, may be the normal mode, the flight mode, or any other state that the wireless devices 10, 10' may attain. However, for the purpose of the present description, it will be assumed that the current state is either normal mode or flight mode.

Figure 5A:
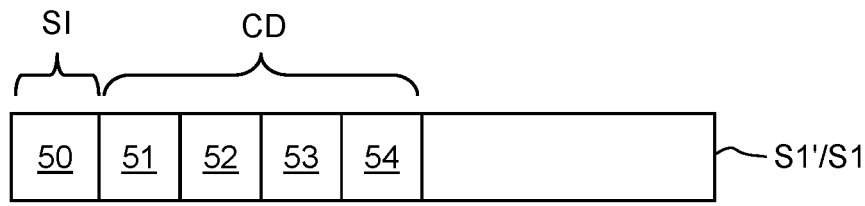
FIGS. 5A-5B are diagrams of example content in signals transmitted between wireless devices in FIGS. 2B-2C.

The method 300 is based on the insight that it is possible to use the current states of other wireless devices 10' within range as input data for deciding the state to be set in the wireless device 10. Thus, in contrast to conventional event detection for switching between normal mode and flight mode, for example as mentioned in the Background section, the event detection is expanded to also be based on the current states of other wireless devices. This effectively expands the sensor system 12 in the wireless device 10 (FIG. 2A) to include the sensor system(s) 12 on the other wireless device(s) 10'. Thus, even if the wireless device 10 is unable to detect a specific event based on sensor data from its sensor system 12, it will benefit from the ability of another wireless device 10' to detect the event. However, the method 300 is also based on the insight that the use of the current states of other wireless device 10' is vulnerable to erroneous detections of events. Specifically, an erroneous state in one wireless device may propagate through all other wireless devices within range of each other, unless precautions are taken. In the example method 300, such a precaution is enabled by the confidence data (CD) which qualifies the state indicator (SI). Thus, by factoring in the confidence of the current state of the wireless device 10', the example method 300 may control the impact of the current state, given by SI, on the state of the wireless device 10. In other words, CD provides a way of moderating the sensitivity of the wireless device 10 to the current states of other wireless devices 10'. Examples of CD are given further below with reference to FIG. 5A.

The combined use of SI and CD in accordance with the example method 300 serves to improve the ability of the wireless device 10 to correctly and autonomously switch between the first and second states.

In some embodiments, step 302 uses the current state, given by SI, for setting the wireless device 10 in normal mode or flight mode only if the confidence, given by CD, exceeds a confidence threshold. Thereby, the state of the wireless device 10' is set as a function of SI and CD in a simple and well-controlled way. The confidence threshold determines, at least in part, the sensitivity of the wireless device 10 to the current states of other wireless devices 10'.

Different confidence thresholds may be applied when the wireless device 10 is in normal mode and flight mode, respectively. For example, for the AND/OR conditions discussed further below (cf. step 404), the confidence threshold may be lower in the normal mode, if it is deemed proper for the wireless device 10, in case of doubt, to be in flight mode rather than in normal mode.

Figure 4A:
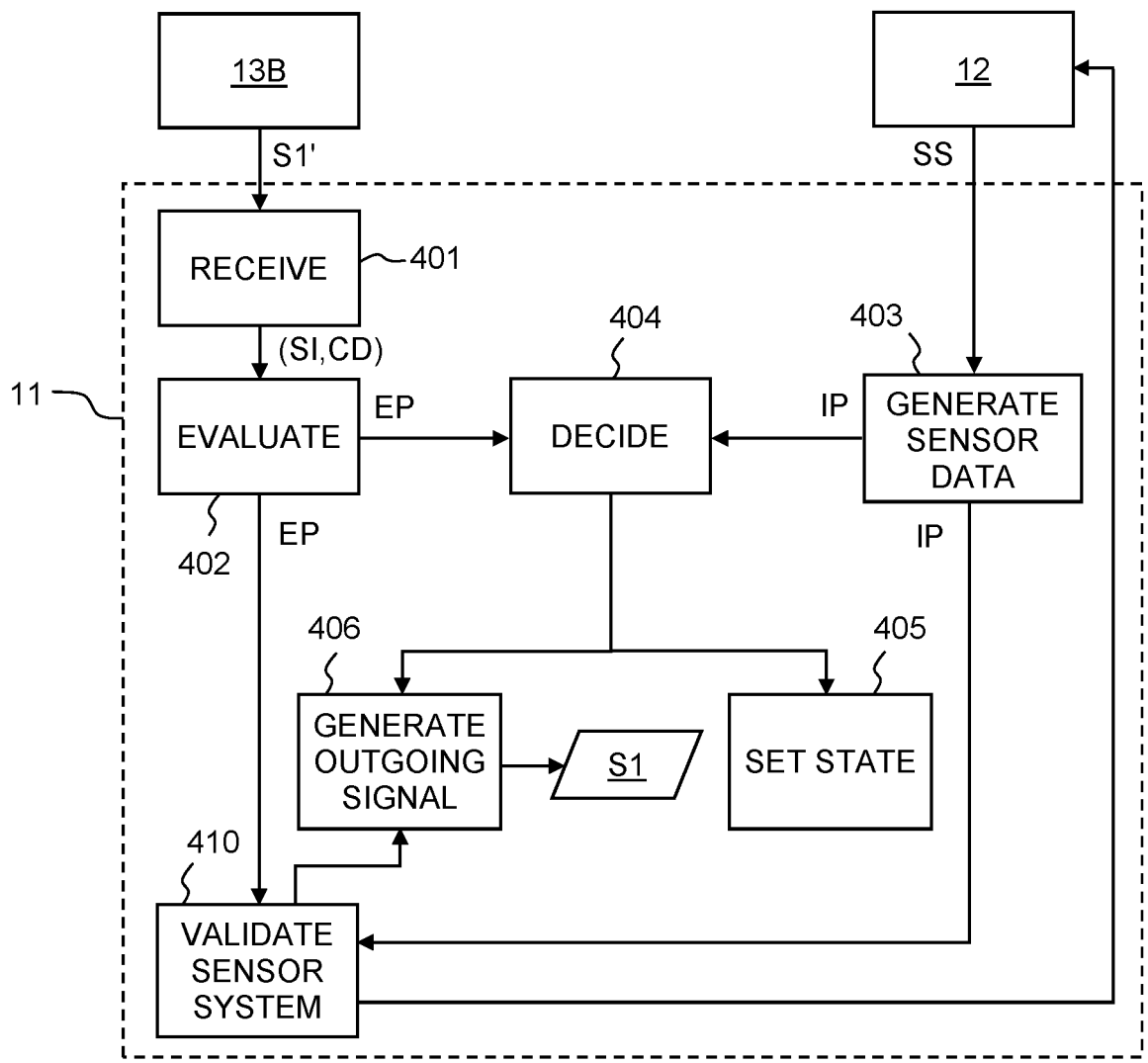
FIG. 4A is a functional block diagram of example sub-systems in the wireless device of FIG. 2.
Figure 4B:
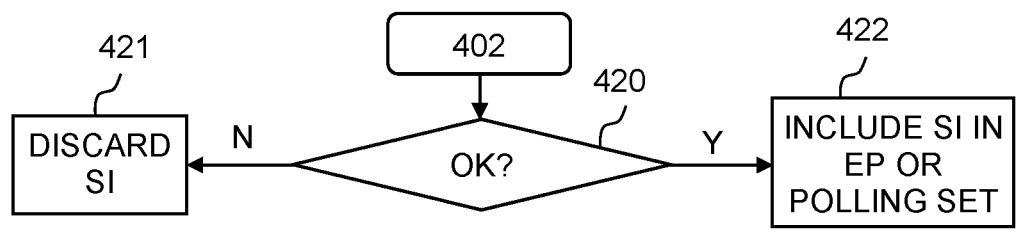
FIG. 4B is flow chart of an evaluation procedure performed by the wireless device in FIG. 4A.

FIG. 4A is a functional block diagram of an example control unit 11 in a wireless device 10, for example as shown in FIGS. 2C-2D. The control unit 11 is configured to perform the method 300 in accordance with an embodiment. In the illustrated example, the transceiver 13B intercepts an incoming sharing signal S1' from another wireless device. The control unit 11 performs step 401 that extracts the state indicator SI and the confidence data CD from the signal S1'. Thus, step 401 receives SI and CD and corresponds to step 301. In step 402, the control unit 11 evaluates SI to determine if SI is to be included as an external parameter EP for use by a decision step 404 and possibly a validation step 410 (below). FIG. 4B shows an example of the evaluation step 402. In step 420, CD is evaluated in relation to a confidence threshold. If the confidence is below the threshold, step 420 proceeds to step 421 which discards SI from further use. Otherwise, step 420 proceeds to step 422 which may include SI as an external parameter EP. Thus, in the illustrated example, step 402 selectively includes SI as an EP based on CD.

It should be understood that the wireless device 10 may receive signals S1' from several wireless devices 10' within range. For example, the wireless device 10 may process signals S1' that are received from different wireless devices 10' during a time period, which may be predefined, to extract SI and CD from the respective signal S1'. This presumes that the signals S1' are unique to each wireless device 10', for example by comprising a unique identifier for each device 10'. Subject to the evaluation in step 402, a plurality of SIs may be included as external parameters, EPs. In an alternative, as also indicated in FIG. 4B, the plurality of SIs may be included in a polling set, from which a single EP may be extracted to represent a collective state of the other devices 10'. In one example, step 402 may extract the single EP as the most common current state in the polling set. However, any logic may be applied to determine the single EP among the current states in the polling set.

It is also conceivable that the control unit 11, if it detects an override condition in step 402, includes a plurality of SIs as EPs, or in the polling set, even if these SIs have a confidence below the confidence threshold. The plurality of SIs may be received from different devices 10' within the above-mentioned time period. The override condition may be detected when a sufficient number of SIs, or a sufficient fraction of the SIs, represent the same current state. The override condition may also require that the current states represented by the SIs, or a sufficient number or fraction thereof, have been set based only on internal parameters IPs, if such information is included in CD (see below).

In the illustrated example, the control unit 11 also obtains one or more sensor signals SS from the sensor system 12. The sensor system 12 may include any type of sensor that is conventionally used for detecting takeoff or landing of an aircraft. For example, the sensor system 12 may include one or more of a pressure sensor for sensing ambient pressure, a motion sensor or vibration sensor for sensing own motion, or a sound detector for sensing ambient sound. The pressure sensor may be of any type and may measure ambient pressure (absolute or relative) inside the wireless device 10, 10' or in the surroundings of the wireless device 10, 10'. The motion sensor may be of any type and may measure one or more of acceleration, velocity or orientation, in absolute terms or in one or more directions. The motion sensor may include one or more of an inertial measurement unit (IMU), an accelerometer with any number of axes, a gyroscope, a magnetometer, etc. The vibration sensor may be of any type and may measure mechanical vibrations experienced by wireless device 10, 10', in one or more frequency ranges. In some embodiments, the vibration sensor is tailored to detect mechanical vibrations generated by an aircraft, for example during takeoff or landing. The sound detector may be of any type and may measure the magnitude of sound waves inside or in the surroundings of the wireless device 10, 10', in one or more frequency ranges. In some embodiments, the sound detector is tailored to detect sound that is typical to an operating aircraft, for example during takeoff or landing.

The control unit 11 receives and processes, by step 403, the sensor signal(s) SS for generation of sensor data that represents one or more properties measured by the sensor system 12, for example pressure, motion, vibration or sound. Step 403 provides the sensor data as one or more internal parameters IP. Such an internal parameter IP may be generated for a measured property or a combination of measured properties. In some non-limiting examples, IP may be a parameter value designating absolute pressure, a change in absolute pressure in relation to a preceding time step, a variability in pressure during a time window, acceleration, velocity, orientation, sound intensity in one or more frequency ranges, vibration intensity in one or more frequency ranges, one or more statistical metrics (mean, standard deviation, RMS, etc.) for acceleration, velocity, orientation, sound intensity, or vibration intensity within a time window, etc.

In step 404, the control unit 11 operates on EP and IP from steps 402, 403 to decide on the state of the wireless device 10. Thus, EP and IP form input variables for the decision step 404. Step 404 may evaluate the input variables in relation to any condition. In the context of an aircraft, it may be desirable to minimize the risk that the device 10 is incorrectly operated in normal mode, for example during takeoff or landing. In some embodiments, this is achieved by step 404 deciding to operate the device 10 in the normal state only if all input variables fulfil a first criterion (AND condition) and to operate the device 10 in the flight mode if at least one of the input variables fulfils a second criterion (OR condition). The first criterion may be that the input variables indicate the normal mode, and the AND condition thereby requires any and all EP to indicate that the current state(s) of device(s) 10' is the normal mode and that any and all IP indicate that current state of device 10 should be the normal mode. The second criterion may be that the input variables indicate the flight mode, and the OR condition thereby requires at least one EP to indicate that the current state(s) of device(s) 10' is the flight mode or at least one IP to indicate that current state of device 10 should be the flight mode. It may be noted that step 404 need not operate on IP. For example, subject to the validation described below (step 410), the sensor system 12 may be disabled and decision step 404 be based on EP only.

In step 405, the control unit 11 sets the state of the wireless device 10 based on the outcome of decision step 404. Step 405 may keep the current state of the device 10 if the current state matches the state determined by step 404, or switch to a new state if the state determined by step 404 differs from the current state of the device 10.

It is understood that the control unit 11 performs steps 401-405 repeatedly, for example at any suitable periodicity.

In the example of FIG. 4A, the control unit 11 further operates the transceiver 13B to transmit an outgoing sharing signal S1, in step 406, in dependence of the outcome of decision step 404. The transmission of signal S1 is shown in FIG. 2C. The outgoing signal S1 may be transmitted for each decision by step 404, or only when the step 405 results in a switch of state. If triggered by a switch of state, step 406 may repeatedly transmit the signal S1 during a time period subsequent to the switch, to increase the likelihood that it is intercepted by other wireless devices 10'. S1 may correspond to S1' and include a state indicator SI representing the current state of the device 10 and confidence data CD representing the confidence of the current state. Here, CD may indicate the confidence of the latest decision taken by step 404 irrespective of outcome. Alternatively, CD may indicate the confidence of the latest decision by step 404 to switch to the current state. Similarly, the confidence data CD that is received by the wireless device 10 from a respective other wireless device 10' (cf. step 301 in FIG. 3 and step 401 in FIG. 4A) may indicate the confidence of the latest decision taken by the device 10', irrespective if the decision is to stay in the current state or switch to the current state. Alternatively, the incoming CD may indicate the confidence of the latest decision taken by the device 10' to switch to the current state.

The confidence data CD may take different forms in the outgoing signal S1, like in the incoming signal S1'. Some non-limiting examples are given in the following with reference to FIG. 5A, which depicts a signal S1, S1'. The signal S1, S1' comprises a portion 50 that contains SI and one or more portions 51-54 that contain CD. Although the following examples refer to the wireless device 10, they are equally applicable to each of the other wireless device 10'. In all examples, CD allows a receiving device to evaluate the confidence of SI.

In some embodiments, S1, S1' comprises a CD portion 51 that is indicative of input data used by the wireless device 10 when deciding to operate in the current state. For example, CD portion 51 may indicate each IP that was received and processed by step 404 when taking the decision on the current state. For example, each IP may be represented by a respective identifier, or a combination of IPs may be represented by an identifier. For example, different versions or configurations of wireless devices 10, 10' may be configured to operate step 404 on different combinations of IPs. In another example, CD portion 51 is indicative of the number of IPs and/or EPs used by step 404, and/or the number of EPs included in the polling set (cf. step 422 in FIG. 4B). In another example, CD portion 51 is indicative of whether step 404 has taken the decision based on one or more EPs. In some embodiments, S1, S1' comprises a CD portion 52 that is indicative of the hardware and/or software configuration of the wireless device 10. For example, different hardware or software versions of the wireless device 10 may be associated with different confidence of the decision by step 404.

In some embodiments, S1, S1' comprises a CD portion 53 that is indicative of the sensor(s) used by step 403 when generating IP for use by step 404. Different sensors or combinations of sensors may be associated with different confidence of the decision by step 404.

In some embodiments, S1, S1' comprises a CD portion 54 that contains a quality score for the decision by step 404 to operate the wireless device 10 in the current state. For example, the quality score may be generated based on any of the parameters described in the foregoing, such as the input data used by step 404, the hardware and/or software configuration, the sensor(s) used, etc.

Reverting to FIG. 4A, the control unit 11 may perform a step 410 which validates the sensor system 12 in view of the state indicator and the confidence data received from one or more devices 10'. The underlying rationale for step 410 is that there should be correspondence, at least over time, between the current state of devices 10' in the surroundings of device 10 and the current state indicated by the sensor data. Deviations may be indicative of a malfunction of the sensor system 12. In some embodiments, step 410 evaluates, for a common time period, IPs generated by step 403 in relation to SIs received by step 401 to identify a defect or malfunction in the sensor system 12. Step 410 may identify a general defect of the sensor system 12 or a defect of a specific sensor in the sensor system 12. In the example of FIG. 4A, step 410 capitalizes on the fact that step 402 has evaluated the received SIs and performs the validation by evaluating IPs in relation to EPs from step 402. In some embodiments, step 410 identifies the defect when a deviation between IPs and EPs persists over a period of time, for example for a number of repetitions of steps 401-405. The deviation may be that EPs indicate one state, while IPs indicate another state.

If a defect is detected, the control unit 11 may disable the defect sensor or the sensor system 12, as indicated by an arrow from step 410 to the sensor system 12 in FIG. 4A. Further, the control unit 11 may also disable step 406, to prevent the outgoing signal S1 from being transmitted, if the confidence of the current state is deemed inadequate when the sensor or sensor system 12 is disabled. In an alternative, step 406 may be controlled to set CD to indicate a significantly reduced confidence of SI in S1.

Figure 4C:
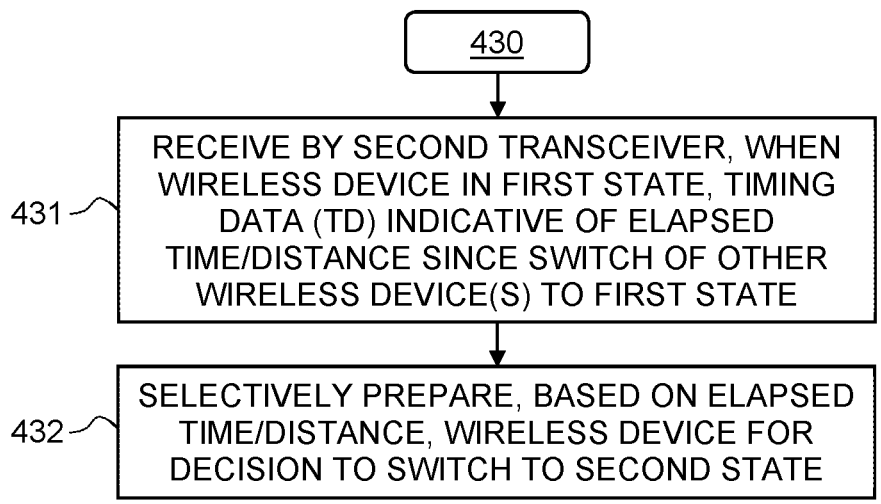
FIG. 4C is a flow chart of an example method performed by a wireless device.
Figure 4D:
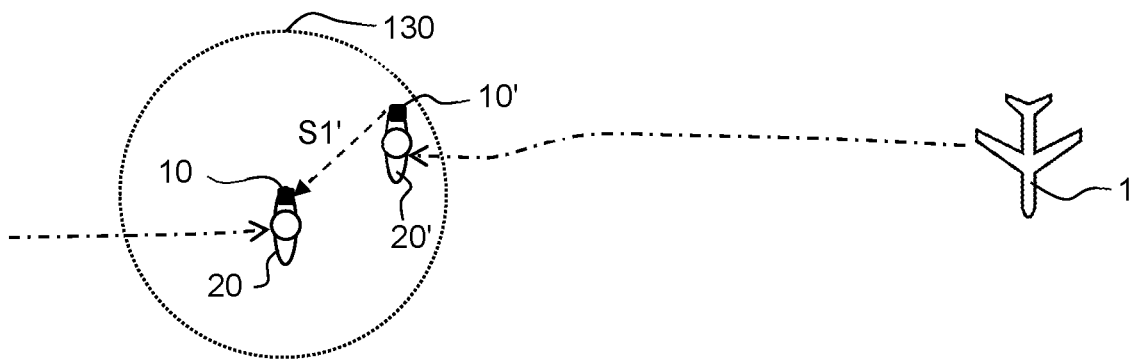
FIG. 4D illustrates a use case for the example method in FIG. 4C.

FIG. 4C is a flow chart of an example method 430 that may be performed by the devices 10, 10' to prepare for detecting a switch to flight mode. FIG. 4D illustrates a corresponding use case. In FIG. 4D, an aircraft 1 has just landed. A first person 20' has disembarked and is moving through the airport towards the exit or a transit gate, as indicated by a dot-dashed arrow. The first person 20' carries a wireless device 10', which has been switched into normal mode when the aircraft 1 is on the ground, for example in accordance with the method 400 in FIG. 4A. A second person 20 is at the airport to depart on a flight. The second person carries a wireless device 10, which is in normal mode. When the devices 10, 10' are within range of each other, as represented by dotted circle 130, the device 10 intercepts a signal S1' transmitted by device 10'. The signal S1' is configured to trigger the device 10 to initiate preparations for detecting a switch into flight mode. Such preparations may comprise increasing the sampling rate of the sensor system 12, increasing the sensitivity of the sensor system 12, activating further sensors of the sensor system 12, etc. This has the advantage of increasing the ability of the device 10 to detect a takeoff event without excessive power consumption, since the power-consuming preparations are initiated when they are likely to be appropriate.

The example method 430 is performed by the device 10 in FIG. 4D. In step 431, the device 10 is in the normal mode and receives, by the short-range transceiver 13B, timing data TD, which is indicative of an elapsed time or an estimated travel distance by the other device 10' since it switched from flight mode. The timing data TD may be included in the signal S1' in FIG. 4D. In step 432, the device 10 evaluates the time/distance to determine if to initiate the above-mentioned preparations. Thus, step 432 selectively prepares, based on the time/distance, the device for a decision to enter flight mode. For example, step 432 may decide to initiate the preparations if the time/distance is below a predefined limit, which implies that the device 10 is located within a departure area of the airport. In an alternative, the device 10 may aggregate TD received from a plurality of devices 10' when taking the decision in step 432 if to initiate preparations or not. For example, preparations may be initiated if a given percentage of TD from different devices during a time period is below the predefined limit.

Reverting to FIG. 4A, step 406 may generate the signal S1 to include TD when step 404 decides to switch the device 10 into flight mode. The signal S1 may be generated, intermittently or continuously, for a predefined time period after the switch into flight mode, with TD being updated to represent the elapsed time or estimated travel distance of the device 10 since the switch. The travel distance may be estimated by use a GNSS receiver (if present) in the device 10, by dead reckoning based of sensor data from a motion or vibration sensor in the sensor system 12, or by any other relative or absolute positioning method.

Figure 5B:

FIG. 5B shows an example of a signal S1, S1' that is generated in accordance with the method 430. The signal S1, S1 includes a portion 50 that contains SI, and at least one portion 57, 58 that contains TD. In FIG. 5B, TD portion 57 represents elapsed time, and TD portion 58 represents estimated travel distance. It is realized that the signal S1, S1' may also include one or more of the CD portions 51-54 in FIG. 5A.

Figure 6:
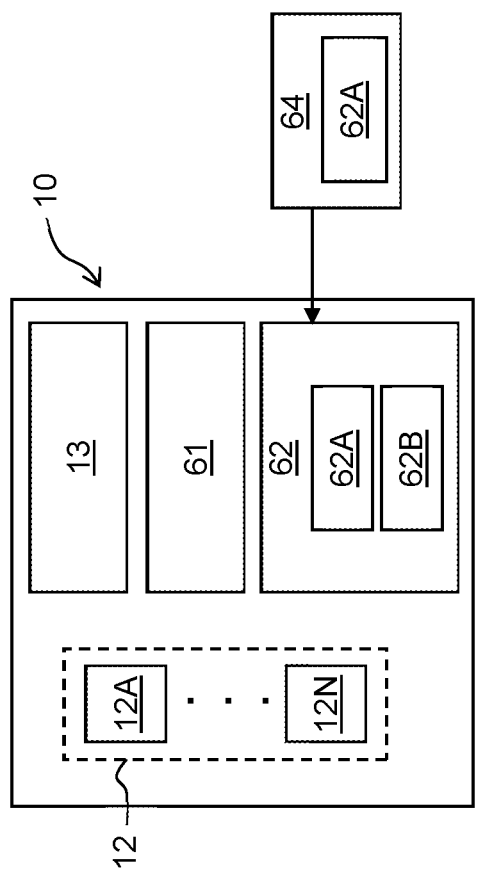
FIG. 6 is a block diagram of a machine that may implement any one of the methods, procedures and functions described herein.

The structures and methods disclosed herein may be implemented by hardware or a combination of software and hardware. In some embodiments, the hardware comprises one or more software-controlled processors. FIG. 6 schematically depicts a wireless device 10, which comprises a sensor system 12 that includes sensors designated by 12A-12N. The wireless device 10 further comprises a processing system 61, computer memory 62, and a wireless communication system 13, which includes a WWAN transceiver and a short-range transceiver. The processing system 61 may include one or more of a CPU ("Central Processing Unit"), a DSP ("Digital Signal Processor"), a GPU ("Graphics Processing Unit"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 62A comprising computer instructions is stored in the memory 62 and executed by the processing system 61 to implement logic that performs any of the methods, procedures, functions, operations, or steps described in the foregoing. The control program 62A may be supplied to the wireless device 10 on a computer-readable medium 64, which may be a tangible (non-transitory) product (for example, magnetic medium, optical disk, read-only memory, flash memory, etc.) or a propagating signal. As indicated in FIG. 6, the memory 62 may also store control data 62B for use by the processing system 61, such as definition data for encoding and decoding of signals S1, S1', definitions of various time periods, thresholds, limits, etc.

While the subject of the present disclosure has been described in connection with what is presently considered to be the most practical embodiments, it is to be understood that the subject of the present disclosure is not to be limited to the disclosed embodiments, but on the contrary, is intended to cover various modifications and equivalent arrangements included within the spirit and the scope of the appended claims.

For example, the present disclosure is not limited to switching between first and second states in relation to aircraft flight events. The methods and structures described hereinabove are equally applicable to any other situation in which a wireless device may switch between states that allow and prohibit use of a wireless transceiver, respectively. In one example, the wireless device may be transported in relation to a geographic region that is defined to prohibit WWAN communication, for example within a building, manufacturing site, etc. In another example, a wireless device may be switched to the second state when located on open sea. For example, it may be desirable to disable a WWAN transceiver in a logistics tracker when the tracker is located on a cargo ship for long-haul shipping, to save power by preventing attempts by the tracker to transmit data to a server over WWAN.

Further, while operations are depicted in the drawings in a particular order, this should not be understood as requiring that such operations be performed in the particular order shown or in sequential order, or that all illustrated operations be performed, to achieve desirable results.

In the following, clauses are recited to summarize some aspects and embodiments as disclosed in the foregoing.

C1. A method performed by a wireless device (10) in a group of wireless devices, wherein each of the wireless devices comprises a first transceiver (13A) for wireless communication and a second transceiver (13B) for wireless communication and is operable to switch between a first state in which the wireless device (10) at least allows data transmission via the first transceiver (13A) and at least allows data reception via the second transceiver (13B), and a second state in which the wireless device (10) at least forbids data transmission via the first transceiver (13A) and at least allows data reception via the second transceiver (13B), said method comprising: receiving (301), by the second transceiver (13B), a state indicator (SI) and confidence data (CD) from a respective other wireless device (10') in the group of wireless devices, wherein the state indicator (SI) indicates a current state of the respective other wireless device (10'), and wherein the confidence data (CD) is indicative of a confidence of the current state of the respective other wireless device (10'); and setting (302) the wireless device in the first or second state based on the state indicator (SI) and the confidence data (CD).

C2. The method of clause C1, wherein said setting (302) the wireless device comprises: using the current state for setting the wireless device (10) in the first or second state if the confidence exceeds a confidence threshold.

C3. The method of C1 or C2, wherein said setting (302) the wireless device comprises: generating input variables (IP, EP) based at least on the state indicator (SI) and the confidence data (CD) from the respective other wireless device (10'), setting the wireless device (10) to operate in the first state only if all input variables (IP, EP) fulfil a first criterion, and setting the wireless device to operate in the second state if at least one of the input variables (IP, EP) fulfils a second criterion.

C4. The method of C3, wherein said generating the input variables (IP, EP) comprises selectively including the state indicator (SI) among the input variables based on the confidence data (CD).

C5. The method of C4, wherein the state indicator (SI) fulfils the first criterion if the state indicator (SI) indicates the first state, and wherein the state indicator (SI) fulfils the second criterion if the state indicator (SI) indicates the second state.

C6. The method of any preceding clause, wherein the confidence data (CD) is indicative of input data used by the respective other wireless device (10') when deciding to operate in the current state.

C7. The method of C6, wherein the confidence data (CD) indicates if said input data is at least partly obtained from a state indicator (SI) received by the second transceiver (13B) of the respective other wireless device (10').

C8. The method of any preceding clause, wherein the confidence data (CD) comprises an indication of a hardware and/or software configuration of the respective other wireless device (10').

C9. The method of any preceding clause, wherein the respective other wireless device (10') comprises a sensor system (12), and wherein the confidence data (CD) is indicative of one or more sensors in the sensor system (12) providing sensor data (IP) used by the respective other wireless device (10') when deciding to operate in the current state.

C10. The method of any preceding clause, wherein the confidence data (CD) comprises a quality score for a decision by the respective other wireless device (10') to operate in the current state.

C11. The method of any preceding clause, wherein the wireless device (10) comprises a sensor system (12), and wherein the method further comprises generating (403) sensor data (IP) from one or more sensor signals (SS) provided by the sensor system (12), wherein the wireless device (10) is set to operate in the first or second state based on the state indicator (SI), the confidence data (CD), and the sensor data (IP).

C12. The method of C11, wherein the sensor data (IP) is representative of one or more of ambient pressure at the wireless device (10), own motion of the wireless device (10), or ambient sound at the wireless device (10).

C13. The method of C11 or C12, further comprising validating (410) the sensor system (12) based on the state indicator (SI) and the confidence data (CD).

C14. The method of C13, wherein said validating (410) comprises: evaluating the sensor data (IP) in relation to the state indicator (SI) of the respective other wireless device (10'), and identifying a defect in the sensor system (12) based on said evaluating.

C15. The method C14, wherein the defect is identified when a deviation between the state indicator (SI) of the respective other wireless device (10') and the sensor data (IP) persists over a period of time.

C16. The method of any preceding clause, further comprising: transmitting (406) by the second transceiver (13B) a state indicator (SI) which indicates a current state of the wireless device (10), and confidence data (CD) which indicates a confidence of the current state of the wireless device (10).

C17. The method of any preceding clause, further comprising: transmitting (406) by the second transceiver (13B), when said setting (302) results in the wireless device (10) being switched from the second state to the first state, timing data (TD) which indicates an elapsed time or an estimated travel distance by the wireless device (10) since the wireless device (10) was switched from the second state to the first state.

C18. The method of any preceding clause, further comprising: receiving (431) by the second transceiver (13B), when the wireless device (10) is in the first state, timing data (TD) from one or more other wireless devices (10'), the timing data (TD) being indicative of an elapsed time or an estimated travel distance by the one or more other wireless devices (10') since the one or more other wireless devices (10') switched from the second state to the first state; and selectively preparing (432), based on the elapsed time or the estimated travel distance, the wireless device (10) for a decision to enter the second state.

C19. The method of any preceding clause, wherein the first transceiver (13A) is a transceiver for wireless WAN communication, and the second transceiver (13B) is a transceiver for wireless short-range communication.

C20. The method of any preceding clause, wherein each of the wireless devices (10, 10') in the group of wireless devices is configured to switch from the first state to the second state when located in an aircraft (1) during takeoff of the aircraft (1), and to operate in the second state when located in the aircraft (1) during landing of the aircraft (1).

C21. A computer-readable medium comprising instructions which, when installed on a processing system (61), causes the processing system (61) to perform the method of any one of C1-C20.

C22. A wireless device comprising a first transceiver (13A) for wireless communication and a second transceiver (13B) for wireless communication, wherein the wireless device is operable to switch between a first state in which the wireless device at least allows data transmission via the first transceiver (13A) and at least allows data reception via the second transceiver (13A, 13B), and a second state in which the wireless device at least forbids data transmission via the first transceiver (13A) and at least allows data reception via the second transceiver (13B), wherein the wireless device is configured to perform a method (300) comprising: receiving (301), by the second transceiver (13B), a state indicator (SI) and confidence data (CD) from a respective other wireless device (10') in a group of wireless devices, wherein the state indicator (SI) indicates a current state of the respective other wireless device (10'), and wherein the confidence data (CD) is indicative of a confidence of the current state of the respective other wireless device (10'); and setting (302) the wireless device in the first or second state based on the state indicator (SI) and the confidence data (CD).

C23. The wireless device of C22, wherein said setting (302) the wireless device comprises: using the current state for setting the wireless device in the first or second state if the confidence exceeds a confidence threshold.

C24. The wireless device of C22 or C23, wherein said setting (302) the wireless device comprises: generating input variables (IP, EP) based at least on the state indicator (SI) and the confidence data (CD) from the respective other wireless device (10'), setting the wireless device (10) to operate in the first state only if all input variables (IP, EP) fulfil a first criterion, and setting the wireless device to operate in the second state if at least one of the input variables (IP, EP) fulfils a second criterion.

C25. The wireless device of C24, wherein said generating the input variables (IP, EP) comprises selectively including the state indicator (SI) among the input variables based on the confidence data (CD).

C26. The wireless device of C25, wherein the state indicator (SI) fulfils the first criterion if the state indicator (SI) indicates the first state, and wherein the state indicator (SI) fulfils the second criterion if the state indicator (SI) indicates the second state.

C27. The wireless device of any one of C22-C26, wherein the confidence data (CD) is indicative of input data used by the respective other wireless device (10') when deciding to operate in the current state.

C28. The wireless device of C27, wherein the confidence data (CD) indicates if said input data is at least partly obtained from a state indicator (SI) received by the second transceiver (13B) of the respective other wireless device (10').

C29. The wireless device of any one of C22-C28, wherein the confidence data (CD) comprises an indication of a hardware and/or software configuration of the respective other wireless device (10').

C30. The wireless device of any one of C22-C29, wherein the respective other wireless device (10') comprises a sensor system (12), and wherein the confidence data (CD) is indicative of one or more sensors in the sensor system (12) providing sensor data (IP) used by the respective other wireless device (10') when deciding to operate in the current state.

C31. The wireless device of any one of C22-C30, wherein the confidence data (CD) comprises a quality score for a decision by the respective other wireless device (10') to operate in the current state.

C32. The wireless device of any one of C22-C31, which comprises a sensor system (12), and wherein the method (300) further comprises: generating (403) sensor data (IP) from one or more sensor signals (SS) provided by the sensor system (12), wherein the wireless device (10) is set to operate in the first or second state based on the state indicator (SI), the confidence data (CD), and the sensor data (IP).

C33. The wireless device of C32, wherein the sensor data (IP) is representative of one or more of ambient pressure at the wireless device (10), own motion of the wireless device (10), or ambient sound at the wireless device (10).

C34. The wireless device of C32 or C33, wherein said method (300) further comprises: validating (410) the sensor system (12) based on the state indicator (SI) and the confidence data (CD).

C35. The wireless device of C34, wherein said validating (410) comprises: evaluating the sensor data (IP) in relation to the state indicator (SI) of the respective other wireless device (10'), and identifying a defect in the sensor system (12) based on said evaluating.

C36. The wireless device C35, wherein the defect is identified when a deviation between the state indicator (SI) of the respective other wireless device (10') and the sensor data (IP) persists over a period of time.

C37. The wireless device of any one of C22-C36, wherein said method (300) further comprises: transmitting (406) by the second transceiver (13B) a state indicator (SI) which indicates a current state of the wireless device (10), and confidence data (CD) which indicates a confidence of the current state of the wireless device (10).

C38. The wireless device of any one of C22-C37, wherein said method (300) further comprises: transmitting (406) by the second transceiver (13B), when said setting (302) results in the wireless device (10) being switched from the second state to the first state, timing data (TD) which indicates an elapsed time or an estimated travel distance by the wireless device (10) since the wireless device (10) was switched from the second state to the first state.

C39. The wireless device of any one of C22-C38, wherein said method (300) further comprises: receiving (431) by the second transceiver (13B), when the wireless device (10) is in the first state, timing data (TD) from one or more other wireless devices (10'), the timing data (TD) being indicative of an elapsed time or an estimated travel distance by the one or more other wireless devices (10') since the one or more other wireless devices (10') switched from the second state to the first state, and selectively preparing (432), based on the elapsed time or the estimated travel distance, the wireless device (10) for a decision to enter the second state.

C40. The wireless device of any one of C22-C39, wherein the first transceiver (13A) is a transceiver for wireless WAN communication, and the second transceiver (13B) is a transceiver for wireless short-range communication.

C41. The wireless device of any one of C22-C40, which is configured to switch from the first state to the second state when located in an aircraft (1) during takeoff of the aircraft (1), and to operate in the second state when located in the aircraft (1) during landing of the aircraft (1).

What is claimed is:

1. A method performed by a wireless device in a group of wireless devices, wherein each of the wireless devices comprises a first transceiver for wireless communication and a second transceiver for wireless communication and is operable to switch between a first state in which the wireless device at least allows data transmission via the first transceiver and at least allows data reception via the second transceiver, and a second state in which the wireless device at least forbids data transmission via the first transceiver and at least allows data reception via the second transceiver, said method comprising:
    receiving, by the second transceiver, a state indicator and confidence data from a respective other wireless device in the group of wireless devices, wherein the state indicator indicates a current state of the respective other wireless device, and wherein the confidence data is indicative of a confidence in a decision by the respective other wireless device to operate in the current state; and
    setting the wireless device in the first or second state based on the state indicator and the confidence data.

2. The method of claim 1, wherein said setting the wireless device comprises:
    using the current state for setting the wireless device in the first or second state if the confidence exceeds a confidence threshold.

3. The method of claim 1, wherein said setting the wireless device comprises:
    generating input variables based at least on the state indicator and the confidence data from the respective other wireless device,
    setting the wireless device to operate in the first state only if all input variables fulfil a first criterion, and
    setting the wireless device to operate in the second state if at least one of the input variables fulfils a second criterion.

4. The method of claim 3, wherein said generating the input variables comprises selectively including the state indicator among the input variables based on the confidence data.

5. The method of claim 4, wherein the state indicator fulfils the first criterion if the state indicator indicates the first state, and wherein the state indicator fulfils the second criterion if the state indicator indicates the second state.

6. The method of claim 1, wherein the confidence data is indicative of input data used by the respective other wireless device when deciding to operate in the current state.

7. The method of claim 6, wherein the confidence data indicates if said input data is at least partly obtained from a state indicator received by the second transceiver of the respective other wireless device.

8. The method of claim 1, wherein the confidence data comprises an indication of a hardware and/or software configuration of the respective other wireless device.

9. The method of claim 1, wherein the respective other wireless device comprises a sensor system, and wherein the confidence data is indicative of one or more sensors in the sensor system providing sensor data used by the respective other wireless device when deciding to operate in the current state.

10. The method of claim 1, wherein the confidence data comprises a quality score for decision by the respective other wireless device to operate in the current state.

11. The method of claim 1, wherein the wireless device comprises a sensor system, and wherein the method further comprises generating sensor data from one or more sensor signals provided by the sensor system, wherein the wireless device is set to operate in the first or second state based on the state indicator, the confidence data, and the sensor data.

12. The method of claim 11, wherein the sensor data is representative of one or more of ambient pressure at the wireless device, own motion of the wireless device, or ambient sound at the wireless device.

13. The method of claim 11, further comprising validating the sensor system based on the state indicator and the confidence data.

14. The method of claim 13, wherein said validating comprises:
evaluating the sensor data in relation to the state indicator of the respective other wireless device, and identifying a defect in the sensor system based on said evaluating.

15. The method claim 14, wherein the defect is identified when a deviation between the state indicator of the respective other wireless device and the sensor data persists over a period of time.

16. The method of claim 1, further comprising:
transmitting by the second transceiver a state indicator which indicates a current state of the wireless device, and confidence data which indicates a confidence of the current state of the wireless device.

17. The method of claim 1, further comprising:
receiving by the second transceiver, when the wireless device is in the first state, timing data from one or more other wireless devices, the timing data being indicative of an elapsed time or an estimated travel distance by the one or more other wireless devices since the one or more other wireless devices switched from the second state to the first state; and
selectively preparing, based on the elapsed time or the estimated travel distance, the wireless device for a decision to enter the second state.

18. The method of claim 1, wherein the first transceiver is a transceiver for wireless WAN communication, and the second transceiver is a transceiver for wireless short-range communication.

19. The method of claim 1, wherein each of the wireless devices in the group of wireless devices is configured to switch from the first state to the second state when located in an aircraft during takeoff of the aircraft, and to operate in the second state when located in the aircraft during landing of the aircraft.

20. A wireless device comprising:
a first transceiver for wireless communication; and
a second transceiver for wireless communication,
wherein the wireless device is operable to switch between
a first state in which the wireless device at least allows data transmission via the first transceiver and at least allows data reception via the second transceiver, and a second state in which the wireless device at least forbids data transmission via the first transceiver and at least allows data reception via the second transceiver,
wherein the wireless device is configured to perform a method comprising:
receiving, by the second transceiver, a state indicator and confidence data from a respective other wireless device in a group of wireless devices, wherein the state indicator indicates a current state of the respective other wireless device, and wherein the confidence data is indicative of a confidence in a decision by the respective other wireless device to operate in the current state; and
setting the wireless device in the first or second state based on the state indicator and the confidence data.

* * * * *